(12) United States Patent
Rison

(10) Patent No.: US 9,148,892 B2
(45) Date of Patent: Sep. 29, 2015

(54) TRANSMITTING DATA

(75) Inventor: Mark Gorthorn Rison, Cambridge (GB)

(73) Assignee: CAMBRIDGE SILICON RADIO LIMITED, Cambridge (GB)

( * ) Notice: Subject to any disclaimer, the term of this patent is extended or adjusted under 35 U.S.C. 154(b) by 182 days.

(21) Appl. No.: 13/601,988

(22) Filed: Aug. 31, 2012

(65) Prior Publication Data

US 2014/0064301 A1 Mar. 6, 2014

(51) Int. Cl.
*H04L 29/02* (2006.01)
*H04W 74/08* (2009.01)
*H04W 84/12* (2009.01)

(52) U.S. Cl.
CPC ............ *H04W 74/085* (2013.01); *H04W 84/12* (2013.01)

(58) Field of Classification Search
CPC .............................. H04L 12/413; H04W 84/10
USPC ......... 370/462, 448, 412, 338, 252; 455/41.2, 455/63.2, 522
See application file for complete search history.

(56) References Cited

U.S. PATENT DOCUMENTS

| | | | |
|---|---|---|---|
| 6,721,331 | B1 | 4/2004 | Agrawal et al. |
| 2004/0240426 | A1* | 12/2004 | Wu et al. ........................ 370/350 |
| 2005/0064817 | A1* | 3/2005 | Ginzburg ..................... 455/41.2 |
| 2005/0141548 | A1* | 6/2005 | Koo et al. ...................... 370/462 |
| 2006/0050728 | A1* | 3/2006 | Sung et al. ..................... 370/448 |
| 2006/0099956 | A1* | 5/2006 | Harada et al. .............. 455/452.2 |
| 2006/0215686 | A1 | 9/2006 | Takeuchi |
| 2007/0049201 | A1* | 3/2007 | Nagano et al. ............... 455/63.2 |
| 2007/0263654 | A1* | 11/2007 | Salokannel et al. .......... 370/448 |
| 2008/0267162 | A1* | 10/2008 | Benveniste .................... 370/347 |
| 2009/0122804 | A1* | 5/2009 | Koo et al. ...................... 370/412 |
| 2009/0138603 | A1* | 5/2009 | Surineni et al. ............... 709/227 |
| 2009/0207825 | A1* | 8/2009 | Koo et al. ...................... 370/338 |
| 2011/0044303 | A1* | 2/2011 | Ji et al. .......................... 370/338 |

(Continued)

FOREIGN PATENT DOCUMENTS

| EP | 0994604 | 4/2000 |
|---|---|---|
| WO | WO 02/054671 | 7/2002 |

(Continued)

OTHER PUBLICATIONS

IEEE Std. 802.11e; IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications, *IEEE Computer Society*, Nov. 11, 2005, pp. 1-189.

Search Report issued Jan. 17, 2014 in corresponding British application GB1216427.3.

*Primary Examiner* — Parth Patel

(74) *Attorney, Agent, or Firm* — Pillsbury Winthrop Shaw Pittman LLP

(57) ABSTRACT

A communication device capable of transmitting data on a communications channel, the communications channel capable of being shared with a number of stations, the communication device being configured to determine a back-off period, the back-off period being a period of time for which the communication device delays transmission of data after determining that the communications channel is idle, wherein the communication device is configured to determine the back-off period in such a way as to favor a decrease in the back-off period in response to an increase in the number of stations.

18 Claims, 3 Drawing Sheets

(56) References Cited

U.S. PATENT DOCUMENTS

2011/0051699 A1* 3/2011 Raman .......................... 370/338
2011/0122780 A1* 5/2011 Nieminen et al. ............ 370/252
2012/0071192 A1* 3/2012 Li et al. ........................ 455/522
2012/0113856 A1* 5/2012 Krishnaswamy ............. 370/252

FOREIGN PATENT DOCUMENTS

| WO | WO 2004/010655 | 1/2004 | |
| WO | WO2004010655 A2 * | 1/2004 | ............ H04L 12/413 |

* cited by examiner

TRANSMITTING DATA

FIELD OF THE INVENTION

The present invention relates to devices, methods and computer programs for transmitting data on a communications channel.

BACKGROUND OF THE INVENTION

In certain wired and wireless communication systems or networks, devices may transmit data over a communications channel (e.g. a band or channel of spectrum, also referred to as a "medium") only after sensing that the channel is not in use ("clear" or "idle"). However, if a plurality of devices that share a channel (for example, devices in a network) each try to transmit immediately after sensing that the channel is not currently in use, all the devices that were waiting for a clear channel may try to transmit at the same time immediately after the channel ceases to be busy. The resulting "collision" between the signals can prevent one or more of the devices from making a successful transmission.

To reduce the chance of such collisions, some wireless communication standards define a "Contention Window" (CW) scheme including a contention period, during which devices that want to transmit will wait, after sensing an open communications channel, before actually performing a transmission. The devices may wait for one or more additional periods along with the contention period. The total amount of time that the devices have to wait (i.e. delay their transmission) can be known as a "back-off period". According to one contention-based scheme, each device may choose a time period randomly, and wait until the channel has been idle for this time period before trying to transmit. The CW helps define the maximum period that the device should wait, e.g., the random time periods are chosen to be within the CW (e.g. between 0 and CW). If the resulting first transmission attempt is unsuccessful, the length of the contention, window can be repeatedly increased for subsequent retries, up to some maximum value, until a retry is successful, or until a maximal number of retransmissions is reached. The length of the contention window may be defined by a first value, denoted CWmin, which defines a maximum initial starting size of the CW (the initial length of the CW being randomly chosen between 0 and CWmin), and a second value, denoted CWmax, which defines the maximal size of the CW.

In some wireless networks, all devices including an access point (AP) contend for the medium. In some wireless communications standards, the AP has more favourable medium access parameters than other devices, e.g. non-AP stations (STAs). However, even the more favourable medium access parameters can be insufficient to mitigate the statistical probability of a STA gaining access to the medium before the AP in the case where there are many STAs contending for the medium. This can result in lowered throughput from the AP to STAs.

Thus there is a need for a mechanism that can help improve the throughput from the AP to STAs when there are many STAs contending for the medium. Additionally, there is need to improve the throughput from the STAs to the AP when there is a low number of STAs contending for the medium. There may also be a need to improve or control the throughput (in either direction) when factors other than the number of STAs in the network affect the throughput. Embodiments of the present invention can help to provide devices, methods and computer programs for transmitting data on a communications channel which, at least partially, can help overcome the abovementioned problems.

SUMMARY OF THE INVENTION

According to a first aspect of the disclosure there is provided a communication device capable of transmitting data on a communications channel, the communications channel capable of being shared with a number of stations, the communication device being configured to determine a back-off period, the back-off period being a period of time for which the communication device delays transmission of data after determining that the communications channel is idle, wherein the communication device is configured to determine the back-off period in such a way as to favour a decrease in the back-off period in response to an increase in the number of stations.

Suitably, the communication device is further configured to determine the back-off period in such a way so as to favour an increase in the back-off period in response to a decrease in the number of stations.

Suitably, the back-off period is dependent on the type of data to be transmitted.

Suitably, the back-off period comprises a random delay period, the random delay period being selected at random between a minimum time and a maximum time, the maximum and/or minimum time being dependent on the number of stations.

Suitably, the maximum time is decreased if the number of stations is increased and/or the maximum time is increased if the number of stations is decreased.

Suitably, the maximum and/or minimum time is dependent on the type of data to be transmitted.

Suitably, the maximum time and the minimum time define a window, the window being a first size when the number of stations is a first number, and the window being a second size, which is smaller than the first size, when the number of stations is a second number, which is greater than the first number.

Suitably, a preferred range of time is comprised between the maximum and minimum time and the probability of the random delay period being selected within the preferred range of time is increased, the preferred range of time being dependent on the number of stations.

Suitably, the maximum time is dependent on the failure of data transmission.

Suitably, the back-off period comprises a first delay period, the first delay period being dependent on the type of data to be transmitted.

Suitably, the first delay period is dependent on the number of stations.

Suitably, the first delay period is increased if the number of stations is decreased and/or the first delay period is decreased if the number of stations is increased.

Suitably, the back-off period is dependent on the number of transmissions made by the communications device and/or at least one of the said stations.

Suitably, the communication device being configured to adjust a second back-off period, wherein at least one of the said stations delays transmission of data at the expiry of the second back-off period.

Suitably, the communication device is configured to begin transmission of data at the expiry of the back-off period, the communications channel being idle or busy at the expiry of the back-off period.

Suitably, the communication device is configured to determine the number of stations sharing the communications channel and, based on that number, determine the back-off period in such a way so as to provide the communications device with a level of access to the communications channel, the level of access being a probability that the communications device will transmit data on the communications channel.

Suitably, the back-off period is decreased in response to an increase in the number of stations and/or the back-off period is increased in response to a decrease in the number of stations.

Suitably, the back-off period is based on the throughput of data of the communication device and of at least one of the said stations.

Suitably, the communication device is configured to transmit data in a frame comprising an indicator, the indicator, in accordance to a communications protocol, being configured to indicate a time period for subsequent frame transmission and/or reception, the communication device being further configured to adjust the indicator such that the probability of transmission of a subsequent frame by the communication device is increased or decreased.

According to a second aspect of the disclosure there is provided a method of transmitting data on a communications channel, the communications channel capable of being shared with a number of stations, the method comprising the step of: determining a back-off period, the back-off period being a period of time for which transmission of data is delayed after determining that the communications channel is idle, wherein the back-off period is determined in such a way so as to favour a decrease in the back-off period in response to an increase in the number of stations.

According to a third aspect of the disclosure there is provided a computer program, the computer program comprising code means that, when executed by a computer, will cause the computer to carry out the step described in the second aspect above.

BRIEF DESCRIPTION OF DRAWINGS

For a better understanding of the present invention, reference is made by way of example to the following drawings, in which.

DETAILED DESCRIPTION

Figure 1A:
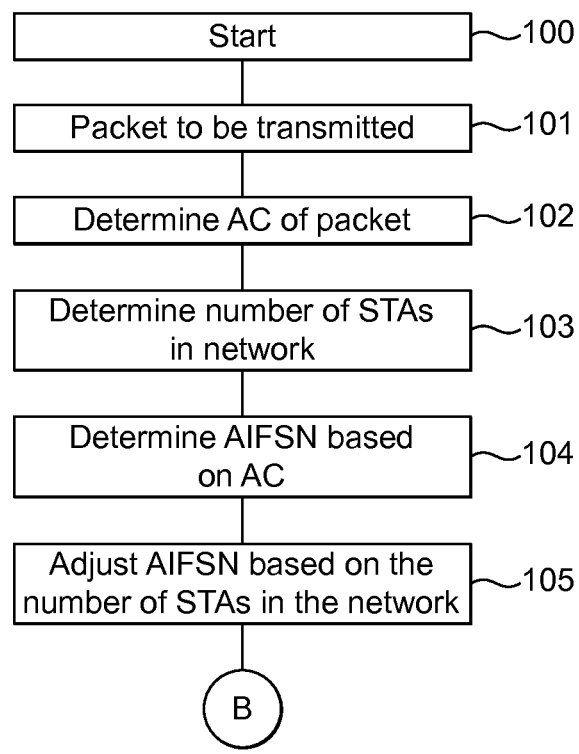
FIGS. 1A-1B show an example of a process for transmitting data.

In the following detailed description, numerous specific details are set forth in order to provide a thorough understanding of some embodiments. However, it will be understood by persons skilled in the art that some embodiments may be practiced without these specific details. In the following, devices using the IEEE 802.11e/WMM (Wi-Fi Multimedia) standard will be used as an example to describe embodiments of the present invention. The invention may be implemented by other types of devices that use other methods, standards or protocols for communication.

Wi-Fi Multimedia (WMM) is a Wi-Fi Alliance specification based on the IEEE 802.11e standard. It provides basic Quality of service (QoS) features to IEEE 802.11 networks. WMM prioritizes traffic according to four Access Categories (AC) in order of increasing priority: background (BK), best effort (BE), video (VI) and voice (VO). There are three medium access parameters per AC: Arbitration Interframe Space Number (AIFSN), CWmin and CWmax. The values of these medium access parameters (hereinafter referred to as "access parameters") can be different for APs and STAs.

When a communication device, such as an AP or STA, wants to transmit a new packet on a given AC, it sets CW to CWmin and may perform the following procedure:

1) It picks a random number counter between 0, for example, and CW inclusive. The counter indicates a number of time slots.
2) It waits until the end of transmitting or receiving a previous packet and then waits for a duration called Short Interframe Space (SIFS)
3) If the medium does not stay idle for a duration of AIFSN slots, it then goes back to step 2
4) If the counter is zero, it then transmits the packet and this procedure terminates
5) If the counter is not zero, it decrements the counter
6) If the medium stays idle during the next slot, it then goes back to step 4, otherwise it goes back to step 2
7) After the device has transmitted the packet and if the transmission failed (e.g. no acknowledgement is received—perhaps because two devices transmitted at the same time), it sets CW to the minimum of: a) 2*(CW+1)−1, where CW is the current value of CW or b) CWmax, and restarts the above procedure from step 1, for the packet that failed.

For simplicity, this procedure as described above does not include details of various additional subtleties such as: frame corruption and EIFS, internal collisions between access categories on a given device, TXOPs and the TXOP Limit, or retry limits.

The access parameters to be used by the STAs may be specified by the AP in the enhanced distributed channel access (EDCA) parameter set or WMM parameter element. The access parameters used by the AP may not be advertised. Preferably, AIFSN must be at least 2 for a STA, and at least 1 for an AP. The values (which indicate the number of time slots) recommended by the IEEE and Wi-Fi Alliance for the parameters are shown in table 1.

TABLE 1

| Access category | Access parameter values | | |
| --- | --- | --- | --- |
| | AIFSN | CWmin | CWmax |
| BK | 7 | 15 | 1023 |
| BE | 3 | 15 | 1023 (STA)/63 (AP) |
| VI | 2 (STA)/1 (AP) | 7 | 15 |
| VO | 2 (STA)/1 (AP) | 3 | 7 |

As can be seen, the AP is given more favourable access to the medium, especially for VI and VO. This is important because there is only one AP but many STAs which need to be served. However, the effect is somewhat limited. For VI, for example, an AP would, in the absence of contention, gain access to the medium after 1 to 8 slots, while a STA would do so after 2 to 9 slots. If there are many STAs contending for the medium, they will in aggregate be more likely to win access to the medium than the AP.

A simulation based on the access parameter values for VI yields the following results (shown in table 2), in terms of the percentage of times the AP wins access to the medium (as opposed to the STAs doing so), when the AP and all the STAs are continuously trying to transmit:

TABLE 2

Simulation results

| Number of STAs | Percentage of AP transmissions |
|---|---|
| 1 | 62 |
| 2 | 50 |
| 3 | 44 |
| 4 | 41 |
| 5 | 39 |
| 6 | 38 |
| 7 | 37 |
| 8 | 37 |

As can be seen, the AP wins access to the medium (hereinafter referred to as a "communications channel") less than half the time as soon as there are at least three STAs. This can be problematic, for example for bidirectional video.

One solution to this problem is for the AP to dynamically adjust its access parameters dependent on the number of STAs sharing a communications channel (which may be a frequency range, a time slot, a coding scheme, a frequency hopping scheme, etc. . . . ) in a network (which comprises an AP and STAs that have access to communicate with the AP). The AP may also dynamically adjust its access parameters depending on other networks (comprising other APs and STAs) within range of it that may also use the same communications channel. The STAs sharing the communications channel in the network contend with the AP to access the communications channel. The access parameters of the AP can be adjusted to adjust the back-off period. The back-off period can be the period of time or number of time slots the AP delays transmission of data after determining that the communications channel is idle. The access parameters can be adjusted such that the AP has a certain level of access to the communications channel. For example, if the access parameters are adjusted such that the back-off period is reduced, the AP has an increased chance of accessing the communications channel before one of the STAs in the network. Thus, if there was an increase in the number of STAs in the network (and thus more STAs competing to access to the communications channel), then the access parameters of the AP can be adjusted so that the back-off period is reduced (or has an increased chance or probability of being reduced), providing the AP with more favourable access to the communications channel.

The level of access required by the AP may be dependent on the characteristics of the data being communicated. For example, an AP may require a certain level of access due to the nature of the traffic, for example requiring at least a 50% level of access for bi-directional video. If an AP has a 50% probability of accessing the communications channel in a network containing a number of STAs and an additional STA was added to the network, then the probability of the AP accessing the communications channel may decrease as there is an additional STA contending for access. The access parameters can be adjusted so that the AP can maintain the level of access (i.e. the probability of gaining access) to the communications channel. Thus more efficient communication is possible by adjusting the access parameters.

The access parameters can be adjusted to adjust the back-off period. The back-off period can be comprised of the AIFSN duration and the counter duration. The AIFSN is a known duration, whereas the counter duration is selected at random. The value for the counter duration may be chosen at random between a minimum (preferably zero, but it may be adjusted) and a maximum (CW). CW can be determined by the parameters CWmin and CWmax. By adjusting the AIFSN and/or CWmin and/or CWmax values, the back-off period can be favourably adjusted. For example, if there was an increase in the number of STAs in the network, the AIFSN of the AP could be reduced, which would lead to a probable decrease in the back-off period. Being able to adjust the access parameters leads to better control of the back-off period, thus allowing the AP and the network to function more efficiently.

If, for example, the AC is VI and there is an increase in the number of STAs, it may not be possible for the AP to reduce its AIFSN value (since it is already 1, and reducing it to 0 would conflict with responses after SIFS). However, the range at which the random counter is selected could be reduced. For example, in step 1) above, the counter could be selected at random between 0 and CW minus CWadjust (i.e. between 0 and (CW−CWadjust)), where CWadjust is a positive number that is less than or equal to CWmin. A reduction in the range (by reducing the upper limit of the range) at which the counter is selected favours a reduction in the back-off period. In other words, the back-off period tends to reduce if the range is reduced (in response to, for example, an increase in the number of STAs). That is, by reducing the range at which the counter is selected (for example, in response to an increase in the number of STAs), the probability of the back-off period being decreased is increased. The access parameters can be adjusted in a manner such that the probability that the back-off period will decrease is proportional to the number of STAs.

A simulation based on the same model as before (the AC being VI), but adjusting CW with CWadjust, gives the following results for various values of CWadjust when there are three STAs:

TABLE 3

CWadjust simulation results

| CWadjust | Percentage of AP transmissions |
|---|---|
| 0 | 44 |
| 1 | 52 |
| 2 | 61 |

As shown in table 3, a value of 1 for CWadjust provides a better balance of the traffic between the AP and the STAs. In another simulation, when the AC is BE, a higher value of CWadjust may be required to maintain a better balance of traffic (for 50% AP transmission with three STAs, CWadjust is 6). Thus the value of CWadjust can be dependent on the type of traffic (e.g. the AC). Similarly, the amount that the AIFSN is adjusted to provide a better balance of traffic can also be dependent on the type of traffic. Thus, the back-off period can be dependent on the type of traffic.

A reduction in the number of STAs in a network would give the AP more favourable access to the communications channel. In the case where a balance of traffic is required between the AP and the STAs, the AP can adjust the access parameters in a way that the back-off period is likely to be increased when there is a decrease in the number of STAs. For example, the value of CWadjust can be made negative to give a better balance of traffic for a small number of STAs in a wireless network. In the case where there is one STA and the AC is VI, a value of negative 2 (−2) for CWadjust would provide the AP with 49% transmission (as opposed to 62% when CWadjust is 0). Alternatively or additionally, the value of AIFSN could be increased when there is a small number of STAs or there is a decrease in the number of STAs to provide a better balance of traffic between the AP and the STAs. Thus, by adjusting the access parameters, the AP can decrease the back-off period in response to an increase in the number of stations and/or increase the back-off period in response to a decrease in the number of stations.

The back-off period can be dependent on the type of data that is being transmitted. As shown above, different ACs have different access parameters, which can lead to different back-off periods. For example, data with an AC of BK will, on average, have a longer back-off period than data with an AC of VO. In another example, certain applications may function more efficiently if there is a certain balance in the traffic between the AP and STAs. In the case of bi-directional video a 50:50 balance between the AP and STAs is preferred. Similarly to the example given above, if there is one STA sharing the communication channel with the AP and the AP is VI, then the percentage of AP transmissions is 62%. It would thus be preferable to adjust to the access parameters (such that the back-off period is likely to increase) so that the percentage of AP transmission is around 50%. In the case of a single STA in the network, the AP may adopt the same medium access parameters as it advertises to the STA for a 50:50 balance in traffic.

The back-off period can be set dependent on the throughput of data. The access parameters can be adjusted to take into account known or measured differences in the throughput of data in each direction between the AP and the STAs or for a particular STA. For example, if the AP measures a drop in the throughput of data (due to, for example, an addition of a STA to the network), then the AP may adjust its access parameters (as described above) to increase its throughput. In another example, a drop in throughput may indicate interference on the communications channel (caused by, for example, another device outside of the wireless network). The AP can adjust its access parameters to compensate for the drop in throughput (due to the interference) so as to increase the chance of a reduction in the back-off period, which can lead to an increase in the rate of transmission attempts made by the AP. Thus, the back-off period can be dependent on the interference (or quality) of the communications channel.

As mentioned above, the back-off period can be determined by the counter, which is chosen at random within a range of values between a minimum and a maximum. The size of the range can be adjusted in response to a change in the number of STAs and/or the type of traffic and/or the level of access required by the AP. The minimum can typically be zero, however this can be adjusted according to the conditions of the network (e.g. the number of STAs or the type of traffic) and the level of access that is required by the AP. The maximum is CW minus CWadjust. CW can be determined from the CWmin and CWmax parameters (which are dependent on the AC). The CWadjust value can be determined by considering, for example, the number of stations in the network and/or the interference on the communications channel and/or the number of devices within range of the network but not in the network (thus interfering with the network) and/or the type of traffic and the level of access required by the AP, etc.

For example, if an additional STA was added to a network, the AP can set the CWadjust to a certain value to reduce the maximum (which would lead to an increased chance that the back-off period would decrease) such that the AP maintains its level of access to the communications channel even though an additional STA is contending for access to the communications channel. Similarly, if an STA was removed from a network, the AP can set the CWadjust to a certain value to increase the maximum (which would lead to an increased chance that the back-off period would increase) such that the AP maintains its level of access to the communications channel even though an there is one less STA contending for access to the communications channel.

The maximum and minimum values can correspond to a maximum and minimum time. The maximum time and the minimum time can define a window. The size of the window can be dependent on the number of STAs and/or the type of traffic and/or the level of access required by the AP. For example, the window can be a first size when the number of stations is a first number, and when the number of stations increases, the window can be adjusted to a second size, which is smaller than the first size.

The selection of the random counter can be adjusted such that there is a greater chance of selecting a counter within a specified range. In other words, the AP could make the selection of the random counter in the range 0 to CW or 0 to CW minus CWadjust non-uniform, so that the selection of the counter is favoured for higher or lower values depending on the requirements of the AP. For example, a preferred range within the window defined by 0 to CW or 0 to CW minus CWadjust can be provided. The randomness of the selection of the counter could be adjusted so that there is an increased probability that a value within the preferred range would be selected. If, for example, the AP requires increased access to the communications channel, the preferred range could be towards the lower values in the window so that there is a greater chance that the back-off period would be decreased. Similarly, if a STA was removed from the network and a better balance of traffic would be provided between the remaining STAs and the AP if the AP decreased its probability of access to the communications channel, the preferred range could be set towards the higher values in the window so that there is a greater chance that the back-off period of the AP would be increased.

As discussed above, the AP can begin transmission of data at the end of the back-off period. When a packet of data is transmitted at the expiry of the back-off period, there is a possibility that the transmission may have failed (for example, because the packet was not received by its intended recipient as a STA transmitted at the same time). The AP can then increase the range at which the counter is chosen for a subsequent transmission attempt of the failed packet. As the back-off period is determined from a larger range of values, the probability of collision is decreased, leading to an increased chance of more successful transmissions. The AP can increase the value of CW up to CWmax. The value of CW can be doubled up to CWmax. It can be possible to increase CW by a lesser amount (e.g. less than double) upon transmission failure. An AP that increases CW upon transmission failure by a lesser amount than the STAs can have more favourable access to the communications channel. The probability that the AP would have a reduced back-off period over a number of transmission attempts would increase if CW was increased at a lower rate. Thus, the back-off period can be dependent on the rate at which CW is increased. Therefore, the level of access of the AP to the communications medium can be dependent on the rate at which CW is increased.

Additionally or alternatively to the AP adjusting its access parameters, the access parameters of the STAs could be adjusted. In a case where an additional STA is added to the network, the access parameters of one or more of the STAs in the network could be adjusted to account for the additional STA so that the AP maintains a level of access to the communications channel. For example, the addition of an STA could be acknowledged by the AP. The AP can then send a request to some or all of the STAs in the network to increase their AIFSN and/or increase the range from which the counter is selected (e.g. by increasing CW). This would lead to a likely increase in the back-off period of the STAs, thus providing the AP with an increased chance of having a shorter back-off period than the STAs.

The AP can transmit data in a frame, which can have a particular size. The frame can consist of a frame header which may contain an indicator (e.g. a duration field) which can specify the time required for an exchange of frames after the end of the current frame (and thus the time that the communications channel will be busy). A STA receiving the frame may read the indicator and, in dependence of the indicator, set a time duration in which it does not attempt to transmit a frame. For example, a receiving STA may receive a frame with a duration field and set its Network Allocation Vector (NAV) accordingly such that it does not attempt to transmit any frames in accordance with the time period indicated by the duration field. The AP can adjust the indicator (e.g. the duration field) in a way so that the probability of transmission by the AP is increased or decreased. For example, the AP can give itself more chance of winning access to the communications channel by sending frames to the STAs with an indicator that has a longer duration than the actual duration of the frame exchange, thus mimicking a longer frame exchange. The STAs that receive frames with the longer duration indicators can then adjust their Network Allocation Vector (NAV) in accordance with the longer duration. Thus the STAs would be inhibited from transmitting for a longer period of time as the STAs would consider that the medium is busy. This can lead to an increased probability that the communications channel will be idle when the AP tries to access it as the STA are holding off transmission attempts for a longer period of time.

Figure 1B:
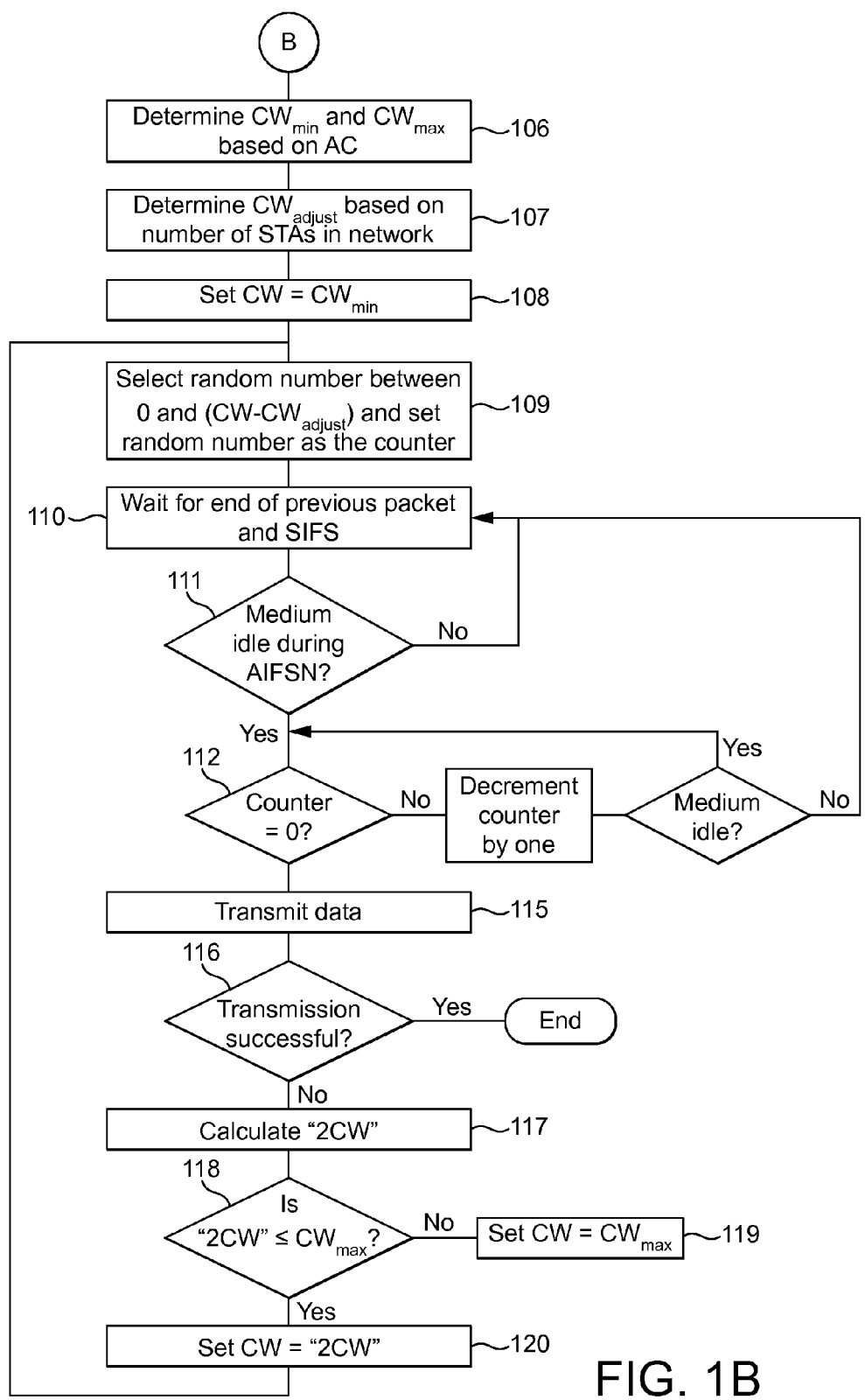

FIGS. 1A-1B diagrammatically shows an exemplary process in which an AP can transmit a packet of data. The process commences at step 100. At step 101, the AP desires to send a packet of data. At step 102, the AP determines the AC of the packet of data.

At step 103, the AP determines the number of STAs in the network (i.e. the number of STAs sharing a communications channel with the AP). Additionally, at step 103, the AP can determine other properties of the network. For example, the AP can determine the quality of the communications channel.

At step 104, the AP determines the AIFSN based on the AC of the packet. The AIFSN can be determined from, for example, a default set of values associated with each AC.

At step 105, the AP can adjust the AIFSN based on the number of stations in the network (determined at step 103). The AP may also adjust the AIFSN based other factors such as, the type of traffic, the level of traffic, the throughput, the quality of the communications channel, etc. The AP may determine that the AIFSN does not require adjustment and can prefer to adjust other access parameters. In some cases, it may be preferable to not allow an adjustment of the AIFSN and thus step 105 can be omitted. The process moves on to step 106 (FIG. 1B).

At step 106, the AP determines the CWmin and the CWmax based on the AC of the packet. The CWmin and CWmax can be determined from, for example, a default set of values associated with each AC.

At step 107, the AP determines the CWadjust based on the number of stations in the network (determined at step 103). The AP may also adjust the CWadjust based other factors such as, the type of traffic, the level of traffic, the throughput, the quality of the communications channel, etc. The AP may determine that no adjustment is required or prefers to adjust other access parameters and set CWadjust to zero.

At step 108, the AP sets CW to CWmin (determined at step 106).

At step 109, the AP selects a random number counter between a minimum and a maximum. In this example, the minimum is zero and the maximum is CW minus CWadjust. As mentioned above, the selection of the random number may be made non-uniform to favour higher or lower values based on the requirements of the AP.

At step 110, the AP waits until the end of the transmission of a previous packet. After determining the end of the transmission of a previous packet, the AP can then wait for a duration called SIFS.

At step 111, the AP then waits for a duration of AIFSN slots (determined at step 104 or 105). If the communications channel does not stay idle for the AIFSN duration, the process goes back to step 110. If the communications channel does remain idle, the process moves on to step 112.

At step 112, the AP checks the value of the counter. If the counter is zero, the process moves on to step 115. If the counter is not zero, the process moves on to step 113.

At step 113, the AP decrements the counter by one and the process moves on to step 114.

At step 114, the AP checks if the medium is idle during the next slot. If the medium is not idle, the process moves back to step 110. If the medium is idle the process moves on to step 112 to check if the count is zero.

At step 115, the AP transmits the packet.

At step 116, the AP determines if the packet was successfully transmitted. This can be done by, for example, receiving an acknowledgement (ACK) if the transmission was successful or not receiving an ACK if the transmission failed. If the packet was successfully transmitted, the process ends. If transmission of the packet failed, then the process moves on to step 117.

At step 117, the AP calculates a "2CW" value. "2CW" can be calculated by "2CW"=2*(CW+1)−1. In certain systems "2CW" may be "2CW"=2*CW.

At step 118, the AP checks the value of CWmax and determines if "2CW" is less than or equal to CWmax. If "2CW" is not less than or equal to CWmax, the process moves on to step 119. If "2CW" is less than or equal to CWmax, the process moves on to step 120. CWmax can be determined from step 106.

At step 119, CW is set to CWmax and the process moves back to step 109.

At step 120, CW is set to "2CW" and the process moves back to step 109.

Steps 118, 119 and 120 may be adjusted if CW is less than doubled, as discussed above. If the process proceeds to step 109 after step 119 or 120, the value of CWadjust may be re-determined.

In the above examples, an AP is used to explain the details of an embodiment of the invention. A STA can also carry out the abovementioned process and functions in a similar way to adjust its access parameters to determine a suitable back-off period. For example, a STA may require more preferable access to the communications channel (due to, for example, the type or importance of data) and thus adjusts its access parameters accordingly. A STA may only be allowed to adjust its access parameters if the AP in its network gives it permission to do so.

Figure 2:
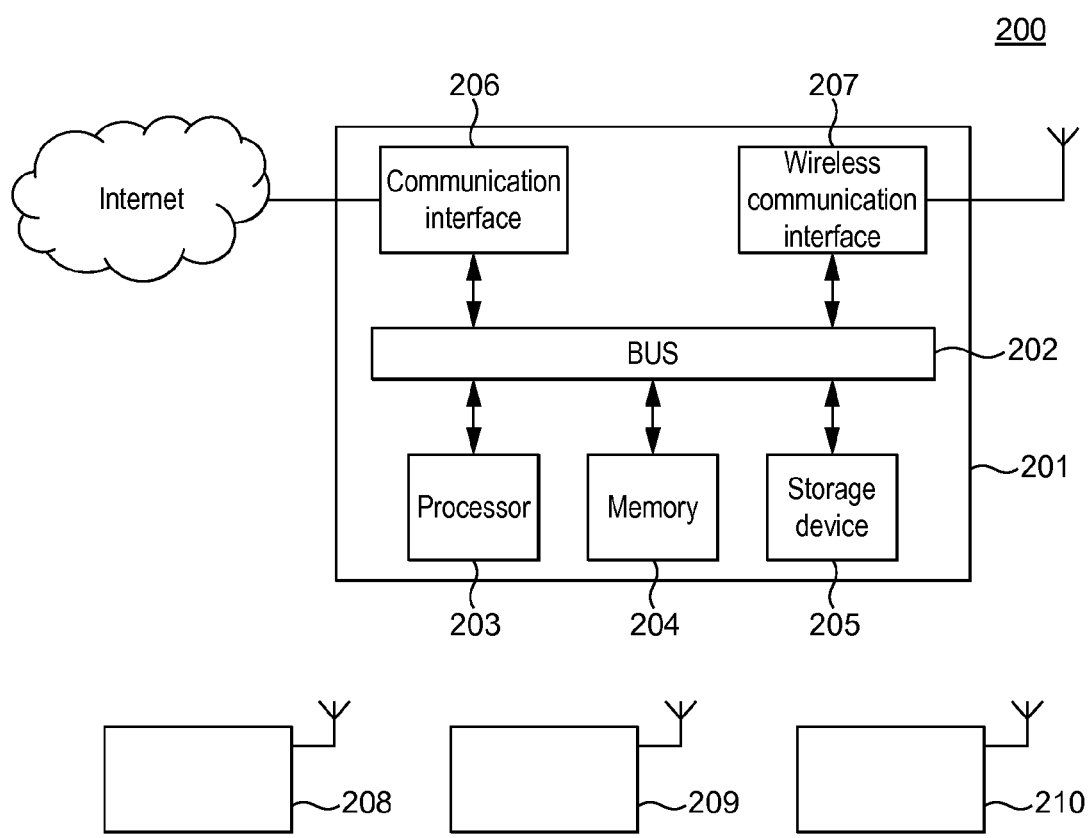
FIG. 2 shows an example of a wireless network.

FIG. 2 is a block diagram that depicts a wireless network 200. The wireless network 200 comprises a computer system, such as access point 201 upon which an embodiment of the invention may be implemented. Access point 201 includes a bus 202 or any other communication mechanism for communicating information, and a processor 203 coupled with bus 202 for processing information. Access point 201 also includes a memory 204, such as a random access memory (RAM) or other dynamic storage device, coupled to bus 202 for storing information and instructions to be executed by processor 203. Memory 204 also may be used for storing temporary variables or other intermediate information during execution of instructions to be executed by processor 203. Memory 204 may further include a read only memory (ROM) or other static storage device for storing static information and instructions for processor 203. A storage device 205, such as a non-volatile storage chip, magnetic disk or optical disk, can be provided and coupled to bus 202 for storing information and instructions.

The invention can be related to the use of access point 201 for implementing the techniques described herein. According to one embodiment of the invention, those techniques are performed by access point 201 in response to processor 203 executing one or more sequences of one or more instructions contained in memory 204. Such instructions may be read into memory 204 from another computer-readable medium, such as storage device 205. Execution of the sequences of instructions contained in memory 204 causes processor 203 to perform the process steps described herein. In alternative embodiments, hard-wired circuitry may be used in place of or in combination with software instructions to implement the invention. Thus, embodiments of the invention are not limited to any specific combination of hardware circuitry and software.

Access point 201 also includes a communication interface 206 coupled to bus 202. Communication interface 206 provides a two-way data communication coupling to another network, such as the internet, LAN, Wireless WAN, etc. The communication interface may establish a connection to another network through a wired or wireless connection.

The access point 201 can send/receive code or data to stations 208, 209 and 210 via a wireless communication interface 207. The AP may communicate wirelessly with the stations 208, 209 and 210 using a wireless protocol such as IEEE 802.11. The received code may be executed by processor 203 as it is received, and/or stored in storage device 205, or other non-volatile storage for later execution. The stations 208, 209 and 210 may access another network (such as the Internet) via the access point 201. The stations 208, 209 and 210 may communicate with each other via the access point 201.

In one example, the processor 203 can be used to carry out the analysis in determining the adjustments made to the access parameters. The access parameters may be adjusted, for example, in response to a change in the number of stations 208, 209, 210 in the network. The processor 203 can be used to model various conditions of wireless network (such as number of stations, type of data, channel quality, etc.) to determine what adjustments, if any, of the access parameters would be most suitable for efficient communication.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

What is claimed is:

1. A communication device capable of transmitting data on a communications channel, the communications channel capable of being shared with a number of stations, the communication device being configured to determine a back-off period, the back-off period being a period of time for which the communication device delays transmission of data after determining that the communications channel is idle, wherein the communication device is configured to determine the back-off period in such a way as to favour a decrease in the back-off period to a minimum time in response to an increase in the number of stations, and once it reaches the minimum time, the communication device is configured to transmit data in a frame, the frame comprising an indicator, the indicator, in accordance to a communications protocol, being configured to specify the time required for an exchange of frames after the end of the current frame, the communication device being further configured to adjust the indicator to indicate a duration that is longer than the actual duration required for an exchange of frames after the current frame, such that the probability of transmission of a subsequent frame by the communication device is increased or decreased, wherein the back-off period comprises a random delay period, the random delay period being selected at random between the minimum time and a maximum time, the maximum and/or minimum time being dependent on the number of stations, and wherein the maximum time is dependent on the failure of data transmission.

2. The communication device according to claim 1, wherein the communication device is further configured to determine the back-off period in such a way so as to favour an increase in the back-off period in response to a decrease in the number of stations.

3. The communication device according to claim 1, wherein the back-off period is dependent on the type of data to be transmitted.

4. The communication device according to claim 1, wherein the maximum time is decreased if the number of stations is increased and/or the maximum time is increased if the number of stations is decreased.

5. The communication device according to claim 1, wherein the maximum and/or minimum time is dependent on the type of data to be transmitted.

6. The communication device according to claim 1, wherein the maximum time and the minimum time define a window, the window being a first size when the number of stations is a first number, and the window being a second size, which is smaller than the first size, when the number of stations is a second number, which is greater than the first number.

7. The communication device according to claim 1, wherein a preferred range of time is comprised between the maximum and minimum time and the probability of the random delay period being selected within the preferred range of time is increased, the preferred range of time being dependent on the number of stations.

8. The communication device according to claim 1, wherein the back-off period comprises a first delay period, the first delay period being dependent on the type of data to be transmitted.

9. The communication device according to claim 8, wherein the first delay period is dependent on the number of stations.

10. The communication device according to claim 8, wherein the first delay period is increased if the number of stations is decreased and/or the first delay period is decreased if the number of stations is increased.

11. The communication device according claim 1, wherein the back-off period is dependent on the number of transmissions made by the communications device and/or at least one of the said stations.

12. The communication device according claim 1, the communication device being configured to adjust a second back-off period, wherein at least one of the said stations delays transmission of data at the expiry of the second back-off period.

13. The communication device according to claim 1, wherein the communication device is configured to begin transmission of data at the expiry of the back-off period, the communications channel being idle or busy at the expiry of the back-off period.

14. The communication device according to claim 1, wherein the communication device is configured to determine the number of stations sharing the communications channel and, based on that number, determine the back-off period in such a way so as to provide the communications device with a level of access to the communications channel, the level of access being a probability that the communications device will transmit data on the communications channel.

15. The communication device according to claim 1, wherein the back-off period is decreased in response to an increase in the number of stations and/or the back-off period is increased in response to a decrease in the number of stations.

16. The communication device according to claim 1, wherein the back-off period is based on the throughput of data of the communication device and of at least one of the said stations.

17. A method of transmitting data from a communication device on a communications channel, the communications channel capable of being shared with a number of stations, the method comprising:
    determining a back-off period, the back-off period being a period of time for which transmission of data is delayed after determining that the communications channel is idle, wherein the back-off period is determined in such a way so as to favour a decrease in the back-off period to a minimum time in response to an increase in the number of stations, and once it reaches the minimum time, the data is transmitted by the communication device in a frame, the frame comprising an indicator, the indicator, in accordance to a communications protocol, being configured to specify the time required for an exchange of frames after the end of the current frame, the method further comprising adjusting the indicator to indicate a duration that is longer than the actual duration required for an exchange of frames after the current frame, such that the probability of transmission of a subsequent frame by the communication device is increased or decreased, wherein the back-off period comprises a random delay period, the random delay period being selected at random between the minimum time and a maximum time, the maximum and/or minimum time being dependent on the number of stations, and wherein the maximum time is dependent on the failure of data transmission.

18. A non-transitory computer readable medium storing thereon a computer program, the computer program comprising code means that, when executed by a computer, will cause the computer to perform the method of claim 17.

* * * * *